United States Patent
Kim et al.

(10) Patent No.: US 9,538,407 B2
(45) Date of Patent: *Jan. 3, 2017

(54) METHOD OF TRANSMITTING AND RECEIVING CONTROL INFORMATION IN WIRELESS COMMUNICATION SYSTEM

(71) Applicant: LG Electronics Inc., Seoul (KR)

(72) Inventors: So Yeon Kim, Anyang-si (KR); Min Seok Oh, Anyang-si (KR); Ki Hyoung Cho, Anyang-si (KR); Seung Hyun Kang, Anyang-si (KR); Ji Ae Seok, Anyang-si (KR); Ji Wook Chung, Anyang-si (KR); Young Seob Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 80 days.

This patent is subject to a terminal disclaimer.

(21) Appl. No.: 14/558,437

(22) Filed: Dec. 2, 2014

(65) Prior Publication Data

US 2015/0109948 A1  Apr. 23, 2015

Related U.S. Application Data

(63) Continuation of application No. 12/450,184, filed as application No. PCT/KR2008/001573 on Mar. 20, 2008, now Pat. No. 8,929,302.

(30) Foreign Application Priority Data

Mar. 20, 2007 (KR) .......................... 10-2007-0027338

(51) Int. Cl.
*H04W 24/08* (2009.01)
*H04W 72/04* (2009.01)
(Continued)

(52) U.S. Cl.
CPC .......... *H04W 24/08* (2013.01); *H04L 27/2627* (2013.01); *H04W 72/042* (2013.01); *H04W 52/0229* (2013.01); *Y02B 60/50* (2013.01)

(58) Field of Classification Search
CPC .. H04W 52/00; H04W 52/02; H04W 52/0209; H04W 52/0212; H04W 52/022–52/0232; H04W 72/04; H04W 72/042; H04W 72/1278; H04W 72/1289; Y02B 60/50
See application file for complete search history.

(56) References Cited

U.S. PATENT DOCUMENTS

2005/0078641 A1  4/2005  Kim
2005/0181832 A1  8/2005  Ishii et al.
2008/0192622 A1  8/2008  Scheim et al.

FOREIGN PATENT DOCUMENTS

WO  2006082761  8/2006

OTHER PUBLICATIONS

Ryoo et al., "Improvement of the Combined AMC-MMO Systems with Independent MCS level selection," 2006 International Conference on Hybrid Information Technology, IEEE Computer Society, vol. 2, 9-11, Nov. 2006, pp. 519-523.

(Continued)

*Primary Examiner* — Pao Sinkantarakorn
(74) *Attorney, Agent, or Firm* — Dentons US LLP

(57) ABSTRACT

A method of receiving control information in a wireless communication system includes receiving position information for searching at least one downlink control channel, a downlink control channel carrying control information of at least one user equipment, receiving multiplexed downlink control channel in which a plurality of downlink control channels are sequentially multiplexed and sequentially searching the downlink control channel on the multiplexed downlink control channel according to the position infor- (Continued)

mation. The number of detection attempts to detect its own control information can be reduced.

6 Claims, 15 Drawing Sheets

(51) Int. Cl.
*H04L 27/26* (2006.01)
*H04W 52/02* (2009.01)

(56) References Cited

OTHER PUBLICATIONS

Liu et al., "Analysis of Modulation and Coding Scheme Selection in MMO-OFDM Systems," ICCE 2006, First International Conference on Communications and Electronics, 2006, Oct. 10-11, 2006, pp. 240-245.

| 00 | 01 | 01 | 01 | 00 | 00 | 00 | 00 | 10 |
|---|---|---|---|---|---|---|---|---|
| UE 1 | UE 2 | UE 3 | UE 4 | UE 5 | UE 6 | UE 7 | UE 8 | UE 9 |

| 1001 | 00 | 01 | 01 | 01 | 00 | 00 | 00 | 00 | 10 |
|---|---|---|---|---|---|---|---|---|---|
| # of UE in a TTI | UE 1 | UE 2 | UE 3 | UE 4 | UE 5 | UE 6 | UE 7 | UE 8 | UE 9 |

| 00 | 01 | 01 | 01 | 00 | 00 | 00 | 11 |
|---|---|---|---|---|---|---|---|
| UE 1 | UE 2 | UE 3 | UE 4 | UE 5 | UE 6 | UE 7 | Identifier |

Fig. 15

| # of UE in a MCS level 1 | # of UE in a MCS level 2 | # of UE in a MCS level 3 | \multicolumn{7}{c}{MIMO Mode Indicator} |
|---|---|---|---|---|---|---|---|---|---|
| 100 | 010 | 010 | 00 | 00 | 01 | 11 | 01 | 00 | 10 | 10 |
|  |  |  | UE 1 | UE 3 | UE 6 | UE 8 | UE 2 | UE 5 | UE 4 | UE 7 |

METHOD OF TRANSMITTING AND RECEIVING CONTROL INFORMATION IN WIRELESS COMMUNICATION SYSTEM

This application is a continuation of U.S. patent application Ser. No. 12/450,184 filed on Sep. 15, 2009, which is a 35 USC §371 National Stage entry of International Application No. PCT/KR2008/001573 filed on Mar. 20, 2008, and claims priority to Korean Patent Application No. 10-2007-0027338 filed on Mar. 20, 2007, all of which are hereby incorporated by reference in their entireties as if fully set forth herein.

TECHNICAL FIELD

The present invention relates to wireless communication and, more particularly, to a method of transmitting and receiving control information in a wireless communication system.

BACKGROUND ART

In a wireless communication system, a base station provides a plurality of user equipments with services. The base station schedules user data with respect to the plurality of user equipments and transmits control information, including scheduling information, to the user equipments together with the user data. A channel carrying the control information is called a control channel and a channel carrying the user data is called a data channel. The user equipments search the control channel to find its own control information and process its own data using the control information.

Before receiving the user data, the user equipment needs to receive the control information. Because the control information is information on decoding of the user data. However, it is common that in a given bandwidth, some pieces of control information of several user equipments are multiplexed within one transmission interval. That is, the base station multiplexes the control information for a plurality of user equipments and transmits the multiplexed control information.

A scheme in which a user equipment receives its own control information of the multiplexed control information is blind detection. The blind detection is a method in which a user equipment decodes the entire data until its own data is found in a situation where the user equipment does not know whether it own data is transmitted from a base station. That is, the user equipment decodes the entire multiplexed control information until its own control information is found in a situation where the user equipment does not know at which part of the multiplexed control information is its own control information placed. The user equipment can employ its unique information in order to determine whether the control information is its own control information. For example, when multiplexing control information of each user equipment, the base station masks an identifier (ID) of each user equipment to a cyclic redundancy check (CRC) of the control information. Each user equipment can determine its own control information by demasking its own ID to the CRC of the control information.

If the user equipment does not correctly detect its own control information from the multiplexed control information, the user equipment cannot decode subsequent user data. Thus, rapid and correct detection of control information plays an important role in the performance of the system. However, there may be a difficulty in detecting control information through only the blind detection.

Each user equipment may require different control information and employ channel encoding using a different code rate. Thus, the size of control information may be different every user equipment. In this case, since offset for blind detection becomes small, the number of detection attempts can be much increased. Further, control information is information unrelated to user data. If the size of the control information increases, it acts as overhead. As the number of user equipments increases, complexity required to decoding control information may increase.

Accordingly, a method is sought for efficiently receiving control information from multiplexed control information.

DISCLOSURE OF INVENTION

Technical Problem

An object of the present invention is to provide a method of receiving control information on a control channel that transmits multiplexed control information in a wireless communication system.

Another object of the present invention is to provide a method of transmitting control information in a wireless communication system.

Technical Solution

In an aspect, a method of receiving control information in a wireless communication system is provided. The method includes receiving position information for searching at least one downlink control channel, a downlink control channel carrying control information of at least one user equipment, receiving multiplexed downlink control channel in which a plurality of downlink control channels are sequentially multiplexed and sequentially searching the downlink control channel on the multiplexed downlink control channel according to the position information.

In another aspect, a method of transmitting control information in a wireless communication system is provided. The method includes transmitting position information for searching control information on a first channel, multiplexing control information of a plurality of user equipments, wherein an identifier of a user equipment is masked to a cyclic redundancy check (CRC) of the control information of the user equipment, and transmitting multiplexed control information on a second channel.

Advantageous Effects

The number of detection attempts to detect its own control information can be reduced. Accordingly, data detection can become faster and power consumption can be saved. Further, complexity due to detection of control information can be reduced.

BRIEF DESCRIPTION OF THE DRAWINGS

FIG. 15 shows an example of a position information bitmap.

MODE FOR THE INVENTION

The following technologies can be used in a variety of communication systems such as a code division multiple access (CDMA) system, a wideband CDMA (WCDMA) system, a frequency division multiple access (FDMA) system, a time division multiple access (TDMA) system, an orthogonal frequency division multiplexing (OFDM)-based system, and an orthogonal frequency division multiplexing access (OFDMA) system. OFDM is a multi-carrier modulation technology of efficiently dividing the entire system bandwidth into a plurality of orthogonal subbands. The subband can be referred to as a tone, resource block, bin or the like. Each subband is associated with at least one subcarrier where data is modulated.

A communication system can be a single-input single-output (SISO) system or a single-input multiple-output (SIMO) system as well as a multiple-input multiple-output (MIMO) system or a multiple-input single-output (MISO) system. The MIMO system uses a plurality of transmitting antennas and a plurality of receiving antennas. The MISO system uses a plurality of transmitting antennas and one receiving antenna. The SISO system uses one transmitting antenna and one receiving antenna. The SIMO system uses one transmitting antenna and a plurality of receiving antennas.

The MIMO scheme is a scheme in which data is transmitted on several paths using two or more antennas and a receiver detects signals received through the respective paths. The MIMO scheme has the characteristics, including spatial diversity, beamforming, spatial multiplexing with respect to one user, spatial multiplexing with respect to several users, and so on. The spatial diversity can stably operate when channel quality information (CQI) feedback from a user equipment has low reliability due to deep fading. Further, to provide service sensitive to delay, the spatial diversity can be used as a technique that copes with fading without waiting until channel condition is improved. Transmission diversity which is one of the spatial diversity can be used when a transmitter has multiple antennas and does not know channel condition. Beamforming is used to increase a signal to interference plus noise ratio (SINR) of a signal by giving weight depending on channel condition in multiple antennas. In beamforming, additional feedback is required in order to know channel condition. Spatial multiplexing with respect to a single user is also called a single user MIMO (SU-MIMO) and the capacity of MIMO channels is proportional to the number of antennas. Spatial multiplexing with respect to multiple users is called spatial division multiple access (SDMA) or multi user MIMO (MU-MIMO).

The MIMO scheme includes a single codeword (SCW) mode in which one codeword, which is a unit for possible error detection, is transmitted through multiple antennas and a multi codeword (MCW) mode in which multiple codewords are transmitted through multiple antennas.

Figure 1:
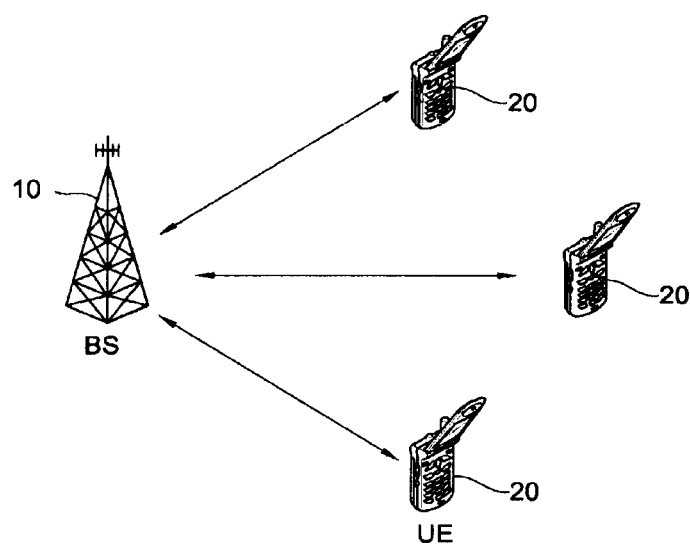
FIG. 1 illustrates a wireless communication system.

FIG. 1 illustrates a wireless communication system.

Referring to FIG. 1, a wireless communication system includes a base station (BS) 10 and at least one user equipment (UE) 20. One or more cells are deployed in one BS 10. The wireless communication system is widely deployed to provide a variety of communication services such as voice and packet data.

The BS 10 generally refers to a fixed station communicating with the UEs 20 and can also be referred to as another terminology, such as node-B, a base transceiver system (BTS) or an access point. The UE 20 can be fixed or mobile and can also be referred to as another terminology, such as a mobile station (MS), a user terminal (UT), a subscriber station (SS) or a wireless device.

Hereinafter, downlink refers to communication from the BS 10 to the UE 20 and uplink refers to communication from the UE 20 to the BS 10. In the downlink, a transmitter can be a part of the BS 10 and a receiver can be a part of the UE 20. In the uplink, a transmitter can be a part of the UE 20 and a receiver can be a part of the BS 10. The BS 10 can include a plurality of receivers and a plurality of transmitters. The UE 20 can include a plurality of receivers and a plurality of transmitters.

Figure 2:
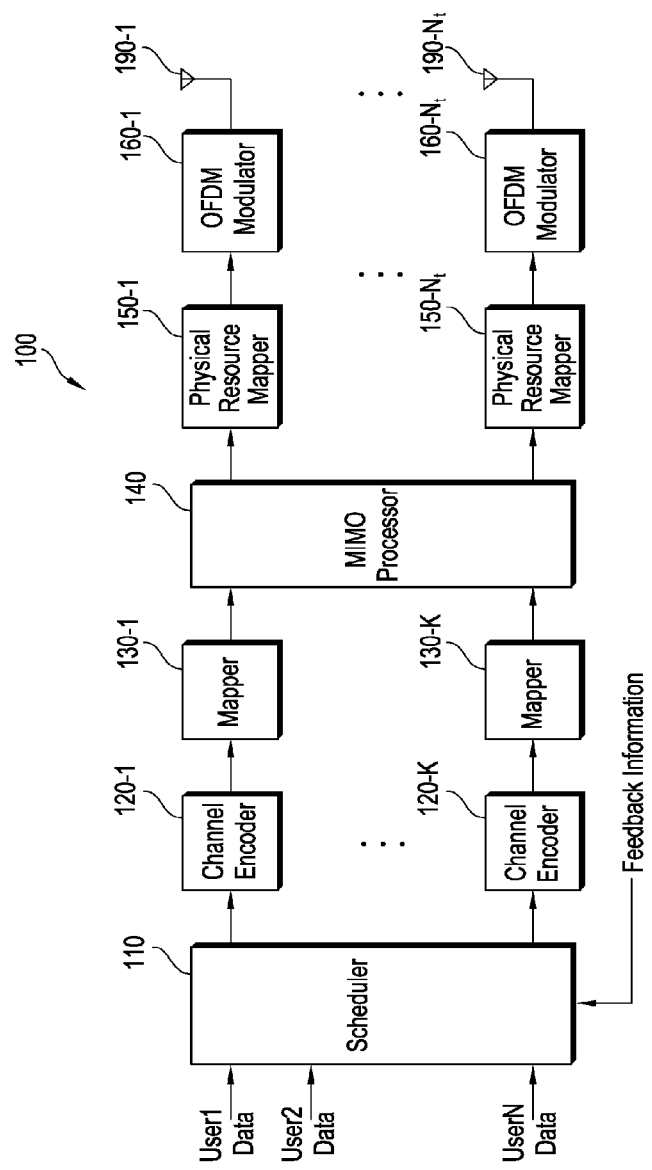
FIG. 2 is a block diagram showing a transmitter in accordance with an embodiment of the present invention.

FIG. 2 is a block diagram showing a transmitter in accordance with an embodiment of the present invention.

Referring to FIG. 2, a transmitter 100 includes a scheduler 110, channel encoders 120-1, . . . , 120-K, mappers 130-1, . . . , 130-K, a MIMO processor 140, and physical resource mappers 150-1, . . . , 150-Nt. The transmitter 100 includes Nt (Nt≥1) transmitting antennas 190-1, . . . , 190-Nt. In downlink transmission, the transmitter 100 can be a part of a BS.

The scheduler 110 receives data with respect to N (N≥1) users and outputs K (K≥1) streams that is transmitted at once. The scheduler 110 selects a modulation and coding scheme (MCS), such as a modulation scheme and a code rate, and a MIMO scheme using feedback information. The scheduler 100 transmits the MCS and the MIMO scheme to the channel encoders 120-1, . . . , 120-K, the mappers 130-1, . . . , 130-K and the MIMO processor 140.

Each of the channel encoders 120-1, . . . , 120-K encodes input streams according to a predetermined coding scheme and generates coded data. Each of the mappers 130-1, . . . , 130-K maps the coded data to data symbols which represent positions on the signal constellation. There is no limit to the modulation scheme. The modulation scheme may be m-phase shift keying (m-PSK) or m-quadrature amplitude modulation (m-QAM). For example, m-PSK may be BPSK, QPSK or 8-PSK and m-QAM may be 16-QAM, 64-QAM or 256-QAM.

The MIMO processor 140 processes the data symbols using an MIMO scheme according to the plurality of transmitting antennas 190-1, ..., 190-Nt. For example, MIMO processor 140 can employ codebook-based precoding and can perform precoding based on a codebook index or precoding matrix received from the scheduler 110.

Each of the physical resource mappers 150-1, ..., 150-Nt assigns input symbols to physical resources such as subcarriers. Each of the OFDM modulators 160-1, ..., 160-Nt modulates input symbols according to the OFDM scheme and outputs OFDM symbols. The OFDM modulator 160 can perform inverse fast Fourier transform (IFFT) on input symbols. A cyclic prefix (CP) can be inserted into a time domain symbol on which IFFT has been performed. The OFDM symbols are transmitted through the transmitting antennas 190-1, ..., 190-Nt.

In the MIMO system, the transmitter 100 can operate according to two modes. One is the SCW mode and the other is the MCW mode. In the SCW mode, transmission signals through the MIMO channel have the same data rate. In the MCW mode, data transmitted through the MIMO channel is encoded independently, so the transmission signals can have different data rates. The MCW mode operates when a rank is greater than 1.

Figure 3:
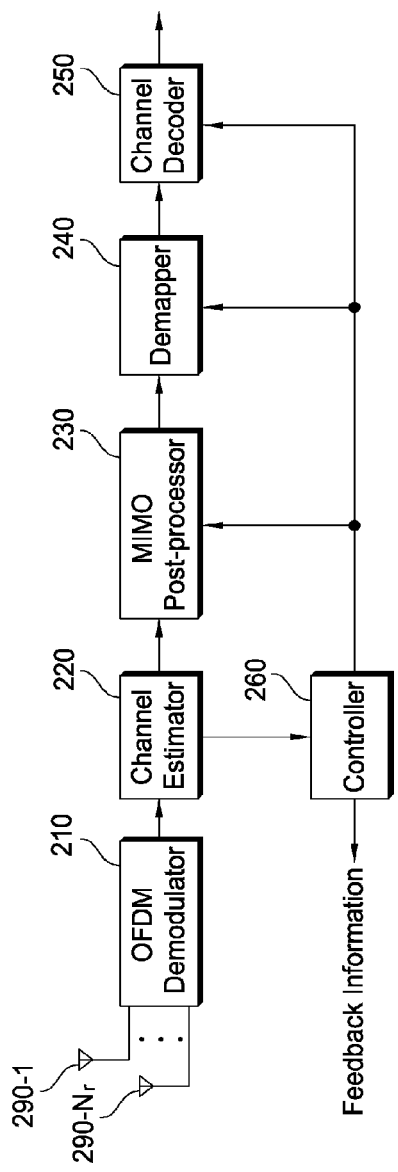
FIG. 3 is a block diagram showing a receiver in accordance with an embodiment of the present invention.

FIG. 3 is a block diagram showing a receiver in accordance with an embodiment of the present invention.

Referring to FIG. 3, a receiver 200 includes an OFDM demodulator 210, a MIMO post-processor 230, a demapper 240, a channel decoder 250, and a controller 260. In the downlink, the receiver 200 can be a part of a UE.

The OFDM demodulator 210 performs fast Fourier transform (FFT) on signals received from receiving antennas 290-1, ..., 290-Nr. The channel estimator 220 estimates a channel and the MIMO post-processor 230 performs post-processing corresponding to the MIMO processors 140-1, ..., 140-K. The demapper 240 demaps input symbols to coded data and the channel decoder 250 reproduces original data by decoding coded data. The controller 260 generates feedback information using the estimated channel and feedbacks the feedback information to the transmitter 100. Further, the controller 260 can transmit an acknowledgment (ACK)/non-acknowledgment (NACK) signal depending on whether data has been successfully received when a hybrid automatic repeat request (HARQ) scheme is used. In a general HARQ scheme, the ACK signal refers to successful reception and the NACK signal refers to reception failure.

Hereinafter, downlink control information is described.

Downlink control information used in a wireless communication system includes scheduling information about downlink data, ACK/NACK information necessary for uplink transmission, and so on. Examples of the downlink control information are listed in the following Table 1.

TABLE 1

| | Field | | Description |
|---|---|---|---|
| Category 1 (resource indication) | ID | | Indicate a UE (or a group of UE) where data transmission is performed |
| | Resource assignment | | Indicate resource block to be demodulated by UE |
| | Duration of assignment | | Used to control valid duration of assignment, TTI or persistent scheduling |
| Category 2 (transport format) | Multi-antenna related information | | Contents dependent on MIMO/beamforming scheme |
| | Modulation scheme | | QPSK, 16-QAM, 64-QAM, etc. |
| | Payload size | | Information about data size according to modulation scheme or number of assigned resource block |
| Category 3 (HARQ) | Asynchronous HARQ | HARQ process number | Indicate HARQ process indicated by current transmission |
| | | Redundancy indicator | Support IR (Incremental Redundancy) |
| | | New data indicator | Handle soft buffer clear |
| | Synchronous HARQ | Retransmission sequence number | Used to extract redundancy version and new data indicator |

The category 1 includes the fields of an ID including information about resource indication, resource assignment, and the duration of assignment. The ID is identifier to identify each UE and can use a medium access control (MAC) address, a cell-radio network temporary identity (C-RNTI) or the like. Each UE determines whether control information is its own control information or not using the ID. A BS masks an ID of each UE to the CRC of control information when multiplexing control information of each UE. Each UE can determine whether information is its own control information by demasking its own ID to the CRC of the control information.

The resource assignment is information, informing which resource block is assigned to each UE. By checking received resource assignment, a UE can know at which part of the entire resources is its own resources placed. The duration of assignment is information, informing the duration where control information is transmitted. A UE can know that control information is transmitted every which transmission time interval (TTI) based in a received duration of assignment. The TTI is a transmission unit of data and indicates the length of a subframe.

The category 2 includes a transport format such as multi-antenna-related information, a modulation scheme, a payload size, etc. The modulation scheme indicates which modulation scheme, such as QPSK, 6-QAM or 64-QAM is used. The multi-antenna-related information indicates information related to multiple antennas.

The category 3 includes HARQ-related information. When asynchronous HARQ is applied, the category 3 includes a HARQ process number, a redundancy version and a new data indicator. When the synchronous HARQ is applied, the category 3 includes a retransmission sequence number. A UE can obtain information on retransmission of data from the control information of the category 3.

The categories listed in Table 1 and the fields included in the categories are only illustrative and the number or kinds of the control information are not limited. The control information may vary and categories thereof may be designated arbitrarily.

Figures 4, 5:
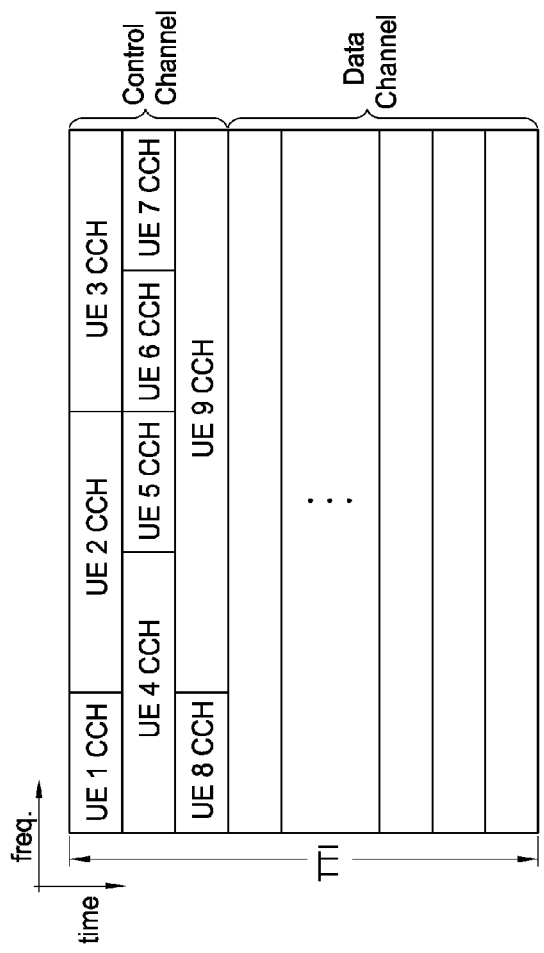
FIG. 4 shows an example of a subframe.
FIG. 5 shows an example of a position information bitmap illustrating position information about control information.

FIG. 4 shows an example of a subframe. This shows that control information of several UEs is transmitted in one subframe.

Referring to FIG. 4, a subframe includes a plurality of OFDM symbols. An interval to transmit the subframe is called as transmission time interval (TTI). The subframe includes at least on control channel and at least one data channel. The control channel can be called a physical downlink control channel (PDCCH) and the data channel can be called a physical downlink shared channel (PDSCH). The control channel can be transmitted in first three OFDM symbols in the subframe. The data channel can b transmitted in the remaining OFDM symbols. The configurations of the control channel and the data channel are only illustrative and the number or positions of OFDM symbols used may be varied depending on a system.

Here, it is assumed that control channels (CCHs) for 9 UEs are transmitted in one subframe. A CCH carries control information for at least one UE.

The length of the CCH of each UE may vary. This is because the code rate and the modulation order used in encoding and modulation of control information can be different. The code rate and the modulation order used in encoding and modulation of data are called a modulation coding scheme (MCS). In general, in the case of control information, about 3 to 4 MCS levels can be considered. The length of CCH may vary depending on the MCS level of the control information. In FIG. 4, it is taken into consideration that the length of the CCH of UE 1, UE 5, UE 6, UE 7 and UE 8 are same since the MCS level of UE 1, UE 5, UE 6, UE 7 and UE 8 are same and the length of the CCH of UE 2, UE 3 and UE 4 are same since the MCS level of UE 2, UE 3 and UE 4 are same.

Table 2 shows a configuration example of MCS levels. Here, three MCS level are taken into consideration.

TABLE 2

| MCS level | MCS level indicator |
|---|---|
| Code rate = 2/3, modulation = QPSK | 00 |
| Code rate = 1/3, modulation = QPSK | 01 |
| Code rate = 1/6, modulation = QPSK | 10 |

Assuming that the modulation order uses only one QPSK and the MCS levels use the code rates 2/3, 1/3, and 1/6, respectively, the length of CCH using the MCS level of the code rate 2/3 becomes a basic length unit. The lengths of CCH using the code rates 1/3 and 1/6 are twice and four times the basic length unit, respectively.

The MCS levels of Table 2 are only illustrative and the number of MCS or the number of MCS levels is not limited. The MCS level indicator is bit representation for representing the position information of CCH (or control information carried by the CCH) as a bitmap scheme. In order to represent the MCS levels as bits, the number of bits as many as $[\log_2(\text{a total number of MCS levels})]$ is required. In this example, since three MCS levels are used, the MCS level indicator can be represented by 2 bits. Hereinafter, [•] refers to the number of bits necessary to represent the corresponding number as bits.

FIG. 5 shows an example of a position information bitmap illustrating position information about control information. This shows an example in which the position information bitmap is configured with respect to the subframe of FIG. 4 and the MCS level indicator of Table 2.

Referring to FIG. 5, position information of each UE is indicated by employing a MCS level indicator with respect to UEs included in one subframe. The position information bitmap is composed of the MCS level indicators of UEs sequentially corresponding to UE 1 to UE 9. Thus, the number of bits required to represent the position information bitmap is the number of UEs×$[\log_2(\text{a total number of MCS levels})]$.

Table 3 shows a configuration example for position information of CCH.

TABLE 3

| Field | Description |
|---|---|
| Category 0 | position information of control channel | Indicate position information of control channel of each UE. Have the number of bits $[\log_2(\text{a total number of MCS levels})]$ |

Here, the category 0 only refers to different category from the categories 1, 2, and 3 of Table 1.

The position information bitmap can simultaneously be transmitted with the CCH or can previously be transmitted. The position information bitmap can be transmitted on a broadcast channel or a L1/L2 control channel. The position information bitmap is broadcast information which is decodes by all UEs in a cell unlike the categories 1, 2, and 3. The position information can be a part of system information and can be transmitted through a radio resource control (RRC) message. The position information can be transmitted periodically.

Figure 6:
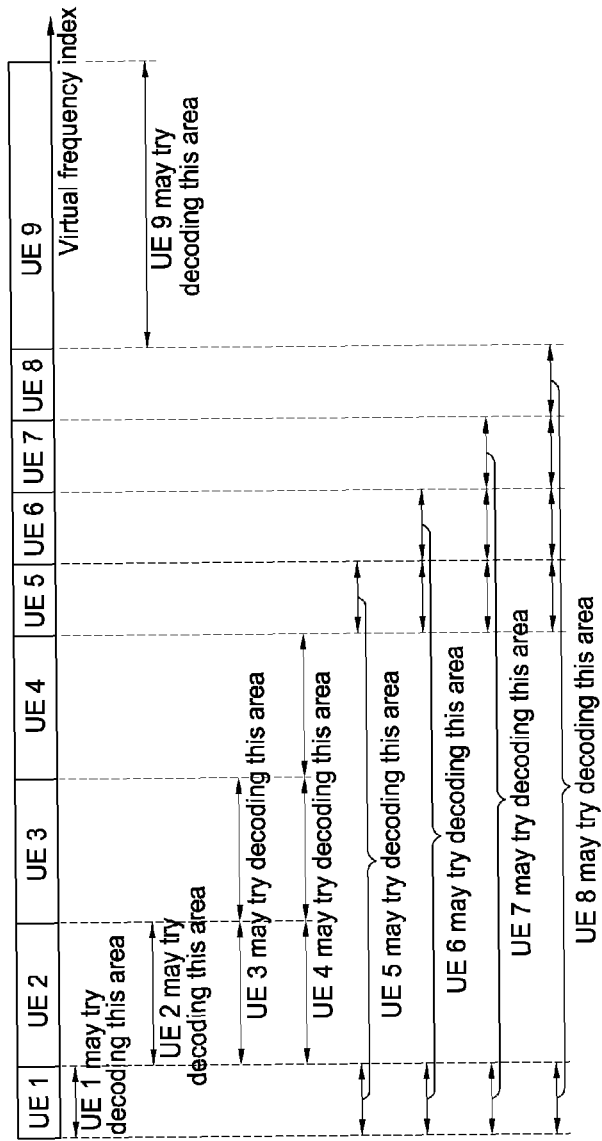
FIG. 6 illustrates detection of control channel using the position information bitmap of FIG. 5.

FIG. 6 illustrates detection of control channel using the position information bitmap of FIG. 5. Each UE knows the MCS level of its own control information and the amount of resources used by the CCH carrying its own control information by position information. Each UE also knows how many CCHs exist in the subframe by using the position information bitmap. Each UE receives the position information bitmap which is transmitted separately from CCHs.

Referring to FIG. 6, each UE tries to detect a CCH according to a position information bitmap. UE 1, UE 5, UE 6, UE 7 and UE 8 try to decode CCH only at positions indicated by MCS level indicator '00'.

The UE 1 monitors CCHs corresponding to its own MCS level beginning with the start point of multiplexed CCHs in which a plurality of the CCHs are transmitted, where monitor implies attempting to decode each of the CCHs. The UE 1 checks whether the decoded control information is its own control information. The UE 5 monitors CCHs corresponding to its own MCS level which is a position indicated by '00', and checks whether the CCH is its own control information. When the CCH is not its own CCH, the UE 5 decodes a CCH at a position indicated by a next '00' in the position information bitmap. The position indicated by a next '00' can be known because a UE knows the amount of resources which is used by the CCH corresponding to each MCS level.

UE 2, UE 3 and UE 4 monitor CCHs at positions indicated by the MCS level indicator '01' of the MCS levels used by UE 2, UE 3 and UE 4. Further, The UE 9 knows the amount of resources which is occupied by the CCH used by the MCS levels '00' and '01', and can try to decode one CCH at a position indicated by the MCS level '10'.

Each UE tries to detect it own control information at a position which is indicated by the position information bitmap. When searching its own CCH on the multiplexed CCH, each UE can decode one CCH of the multiplexed CCH and check its own CCH by employing UE's unique ID. For example, a UE can check CRC error after damasking the CRC of the control information with it's ID. When CRC error does not exist, decoded control information is its own control information. When the UE receives its own control information, the UE receives data by using the control information. When the decoded control information is not its own control information, the UE monitors next CCH and tries to detect control information.

By using the position information, a UE can effectively search CCHs. When control information for a plurality of UEs is multiplexed in the multiplexed CCH, a BS transmits the position information so that the UE searches its own CCH on the multiplexed CCH according to the position information.

Figures 7, 8, 9:
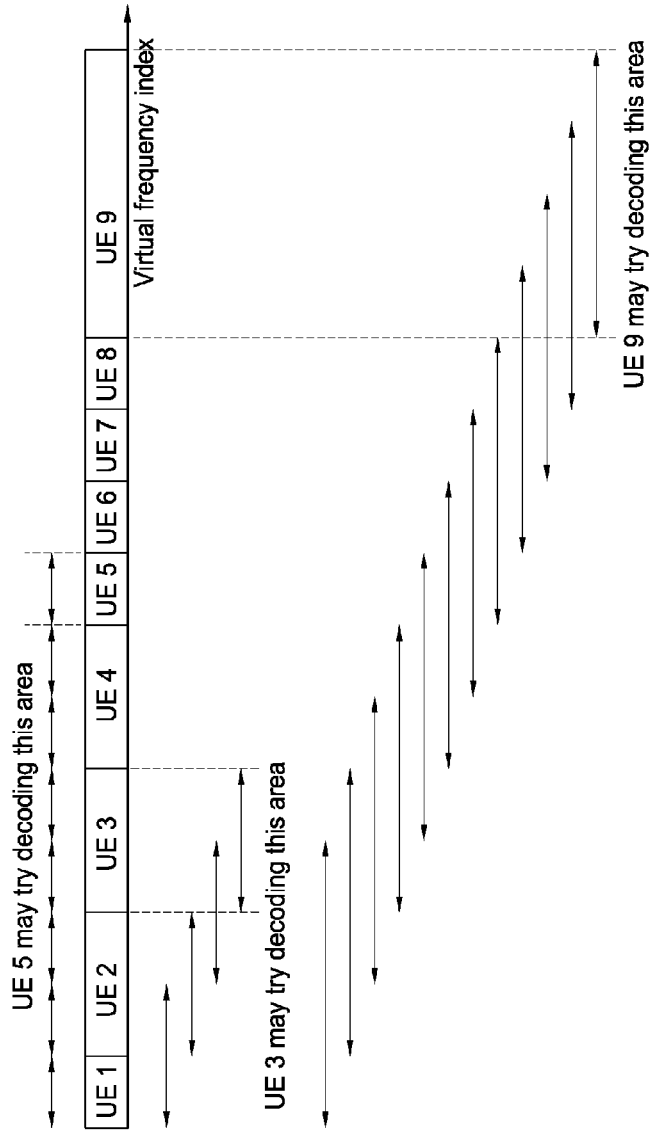
FIG. 7 shows a conventional method of detecting control information.
FIG. 8 shows another example of a position information bitmap.
FIG. 9 shows still another example of a position information bitmap.

FIG. 7 shows a conventional method of detecting control information. When control information of several UEs is multiplexed in one subframe, a UE which receives the multiplexed control information does not know where its own control information is. The UE has to monitor all CCHs in the subframe until its own control information is detected.

Referring to FIG. 7, the length of CCH of each UE varies depending on MCS. Assuming that each UEs use the same MCS levels as those of the embodiment of FIG. 6, the length of CCH of UE 1, UE 5, UE 6, UE 7 and UE 8 becomes a basic unit. The length of CCH of UE 2, UE 3 and UE 4 is twice the basic unit and the length of CCH of UE 9 is four times the basic unit. Each UE does not know where its own control information is. Thus, a UE monitors CCHs until the UE finds its own CCH every length of CCH corresponding to its own MCS.

For example, the UE 5 performs eight detection attempts so as to find its own control information. This means that the UE 5 decodes control information in a CCH, damasks it's ID to the CRC of the control information, and when no CRC error exists, determines that the control information is its own control information. When CRC error exists, the UE 5 determines that the control information is not its own control information and continues to monitor next CCH. UEs other than UEs having the control information of the basic unit length perform detection until they find their own control information every length unit of control information according to their own MCSs, but perform detection with offset of the basic unit length.

Table 4 shows the number of detection attempts in the proposed method in the embodiment of FIG. 6 and a conventional method in the example of FIG. 7.

TABLE 4

| UE | Conevntional method | Proposed method |
| --- | --- | --- |
| 1 | 1 | 1 |
| 2 | 2 | 1 |
| 3 | 4 | 2 |
| 4 | 6 | 3 |
| 5 | 8 | 2 |
| 6 | 9 | 3 |
| 7 | 10 | 4 |
| 8 | 11 | 5 |
| 9 | 12 | 1 |

According to the proposed method, the number of detection attempts in order to find its own CCH can be reduced. By using the position information bitmap, detection is attempted only at the position of the CCHs where same MCS levels are used. As detection attempts decreases, complexity due to decoding of the control information is reduced. When channel encoding scheme having high decoding complexity such as a tail biting code is used, the complexity can be much lowered. Further, the UE can save power consumption used for decoding.

FIG. 8 shows another example of a position information bitmap.

Referring to FIG. 8, a position information bitmap includes a count field and position information. The count field represents a number of CCHs that are multiplexed in the the position information bitmap. Or, the count field can represent the number of UEs which can be multiplexed in the TTI. The number of bits of the count field is $[\log_2(\text{the maximum number of UEs included in one TTI})]$.

Table 5 shows a configuration example of the position information bitmap.

TABLE 5

| | Field | Description |
| --- | --- | --- |
| Category 0 | Number of UE | Indicate how many UEs exist in a corresponding TTI. Have the number of bits $[\log_2$ (a maximum number of UEs included in one TTI)] |
| | Position information of control channel | Indicate position information of control channel of each UE. Have the number of bits: the number of UEs × $[\log_2$ (a total number of MCS levels)] |

In this figure, a maximum number of UEs is 10 and the count field has 4 bits. The size of the position information bitmap may be variable depending on the maximum number of UEs that can be multiplexed in one TTI.

A UE can know how many CCHs are multiplexed in the corresponding TTI based on the count field, and attempts to detect control information using the position information.

FIG. 9 shows still another example of a position information bitmap.

Referring to FIG. 9, a position information bitmap is represented as many as a number of UEs that are multiplexed in one TTI. If the maximum number of UEs is predetermined, position information on all UEs can be represented by the bitmap. Here, the number of bits of the position information bitmap is the maximum number of UEs×$[\log_2$(a total number of MCS levels)]. If the maximum number of UEs that can be multiplexed in a TTI is different from a actual number of UEs that is multiplexed in the TTI, an identifier can be included in the position information bitmap. The identifier at the tail of the position information bitmap can indicate the end of the position information bitmap. In this example, a portion indicated by '11' in the bitmap is the identifier. When only 7 UEs are multiplexed in the TTI although the maximum number of UEs that can be multiplexed in the TTI is 9, the identifier is added. The identifier may be of any kind and the number of bits or contents thereof is not limited.

A UE can acquire information on the number of multiplexed UEs based on the position information bitmap having fixed length even if the UE does not know the number of multiplexed UEs. For example, the UE knows that one MCS level indicator indicates position information of one UE. Thus, the UE can know the number of multiplexed UEs by checking the number of MCS level indicators. When the maximum number of multiplexed UEs is same as the number of multiplexed UEs in one TTI, an identifier need not to be added.

Figure 10:
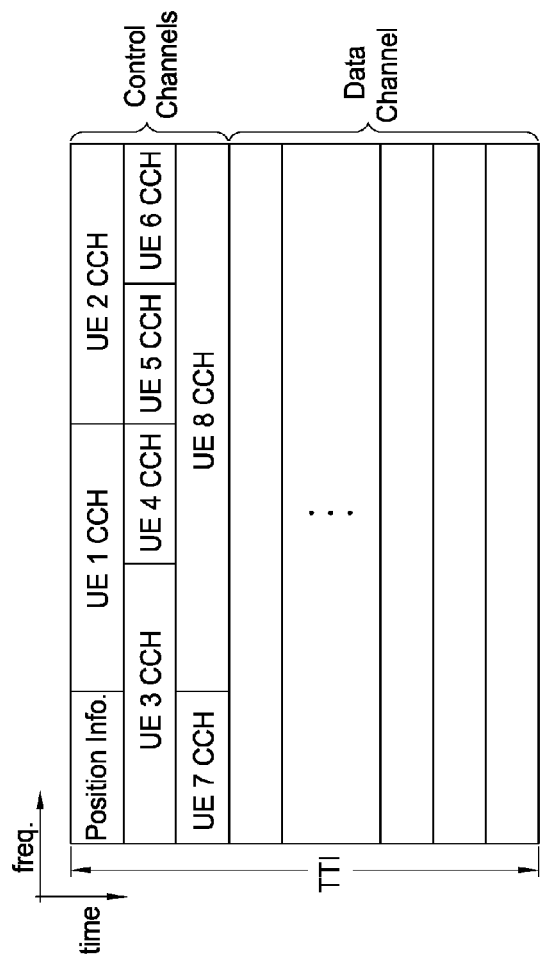
FIG. 10 shows an example of transmitting a position information bitmap.

FIG. 10 shows an example of transmitting a position information bitmap.

Referring to FIG. 10, the position information bitmap is transmitted with CCHs in a subframe. All UEs in a cell get firstly the position information bitmap in the subframe and then monitors CCHs.

Here, although the position information bitmap is placed in a first OFDM symbol, the position of the position information bitmap is not limited.

A method of transmitting control information in which the MIMO scheme is taken into consideration is now described.

In the MIMO system, a MIMO mode related to multiple antenna information such as antenna configuration information, rank information and the number of codewords used is needed. Thus, the length of the CCH can be varied depending on not only the MCS level but also the MIMO mode. It means that the UE can have a different number of bits of necessary control information depending on the MIMO mode. Accordingly, when considering up to the MCS level as well as the MIMO mode, it is not easy to decide an offset used to monitor CCHs. In accordance with the embodiment of FIG. 4, the length of resources occupied by UEs is the basic unit length and is twice and four times the basic unit length depending on the MCS level. But the amount of resources is further increased when considering the MIMO mode. Thus, the number of detection attempts to detect CCH can be increased significantly. Therefore, in the case of the MIMO system, it would be further necessary to previously designate position information of control information to each UE.

For clarity, the MCS levels and the MCS level indicators listed in Table 2 are used. Table 6 shows a configuration example of the MIMO mode. Here, four kinds of MIMO modes are taken into consideration.

TABLE 6

| MIMO mode | MIMO mode indicator |
| --- | --- |
| SISO | 00 |
| SU-MIMO (SCW) | 01 |
| SU-MIMO (MCW) | 10 |
| MU-MIMO | 11 |

The SISO mode refers to a case where a UE has one antenna and does not limit the number of antennas of a BS. The MIMO mode refers to a case where a UE has multiple antennas and does not limit the number of antennas of a BS. The BS can have one or more antennas.

The MIMO mode indicator is bit representation for representing position information of control information using a bitmap. In order to represent the MIMO mode by bits, bits as many as [$\log_2$(a total number of MIMO modes)] are required in each MIMO mode. In this example, since the four MIMO modes are used, the MIMO mode can be represented by 2 bits.

The MIMO modes are only illustrative and the kind or number of the MIMO modes can be changed in various ways.

Figure 11:
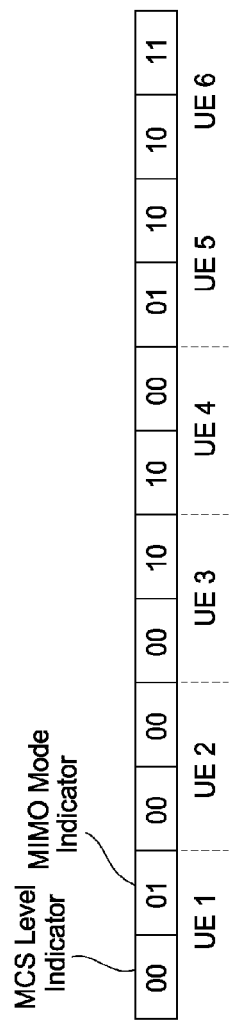
FIG. 11 shows an example of a position information bitmap.

FIG. 11 shows an example of a position information bitmap.

Referring to FIG. 11, in order to reduce the number of detection attempts in a situation where UEs using several MIMO modes and MCS levels are multiplexed in one TTI, a position information bitmap includes the MCS level indicators and the MIMO mode indicators of Tables 2 and 6. Here, the position information bitmap for six UEs is shown. UE 1, UE 3, UE 5 and UE 6 have multiple antennas, and UE 2 and UE 4 have one antenna.

In the position information of each UEs, the former 2 bits indicates the MCS level indicator and the latter 2 bits indicates the MIMO mode indicator. They are only illustrative and the former 2 bits can indicate the MIMO mode indicator and the latter 2 bits can indicate the MCS level indicator. Alternatively, the MCS level indicators of the all UEs can be all listed and the MIMO mode indicators of the all UEs can be then listed. Alternatively, the MIMO mode indicators of the all UEs can be all listed and the MCS level indicators of the all UEs can be then listed. A method of configuring the position information bitmap by employing the MCS level indicators and the MIMO mode indicators is not limited to the above method.

Position information of control information for each UE is represented using the bitmap including the MCS level indicators and the MIMO mode indicators. The number of bits necessary to configure the position information bitmap is the number of UEs×{[$\log_2$(a total number of MCS levels)]+[$\log_2$(a total number of MIMO modes)]}.

Table 7 shows a configuration example of position information.

TABLE 7

| | Field | Description |
| --- | --- | --- |
| Category 0 | position information of control channel | Indicate position information of control channel of each UE. Have the number of bits: the number of UEs × {[$\log_2$ (a total levels) number of MCS ] + [$\log_2$ (a total number of MIMO modes)]} |

The position information bitmap can be transmitted on a broadcast channel or a L1/L2 control channel.

Figure 12:
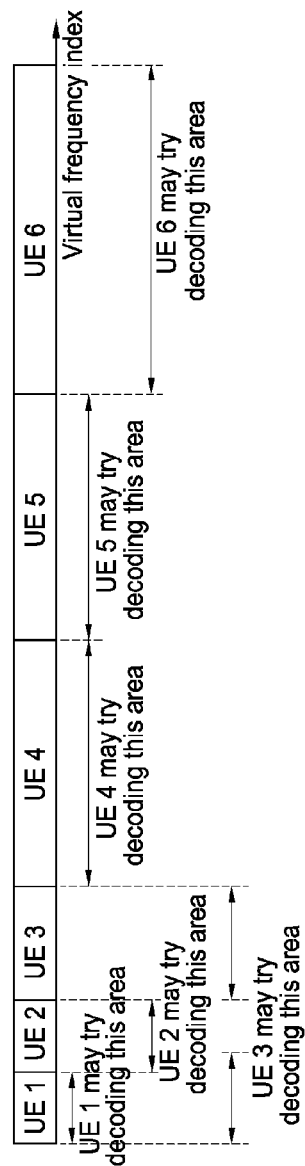
FIG. 12 illustrates detection of control information using the position information bitmap of FIG. 11.

FIG. 12 illustrates detection of control information using the position information bitmap of FIG. 11. A UE knows its CCH's MCS level and MIMO mode. Further, the UE knows how many UEs are multiplexed in a TTI and the number of antennas. The UE receives position information on a control channel or a broadcast channel.

Referring to FIG. 12, each UE monitors CCHs at positions where position information is indicated by a MCS level and a MIMO mode that can be supported by the UE. Each UE checks a MCS level and a MIMO mode in the position information bitmap, and tries to detect control information only at a corresponding position. When a UE does not support multiple antennas, the UE tries detection of control information only at a position whose MIMO mode indicator represents 'SISO'. When a UE supports multiple antennas, the UE tries detection of control information only at a position whose MIMO mode indicator does not represent 'SISO'.

The UE 1 using multiple antennas monitors CCHs at the position where the MCS level indicator is '00' and the MIMO mode indicator does not represent 'SISO'. Thus, the UE 1 decodes control information at the position where MIMO mode indicator represents 'SU-MIMO' and MCS level is '00' from the start part of the subframe, and checks whether the decoded control information is its own control information. The UE 2 using one antenna tries detection of control information only at the position where a MCS level is '00' and a MIMO mode indicator represents 'SISO'. Therefore, since a UE knows the number of its antennas, the UE does not need to attempt detection of the control information at the position where different MIMO mode is used. This can reduce the number of detection attempts. The UE 3 using multiple antennas tries detection at the position where the MCS level is '00' and the MIMO mode is not 'SISO', so that only two detection attempts are necessary.

A UE can determine whether a MIMO mode is 'SISO' or 'MIMO' based on the number of its antennas although the UE does not know its own MIMO mode accurately. Accordingly, the UE can monitor CCHs only at a position where possible MIMO mode is used. In this manner, each of UE 4, UE 5 and UE 6 can monitor CCHs according to the position information.

When its own control information is detected, the UE receives data using the control information. When its own control information is not detected, the UE monitors another CCH at next position according to the position information bitmap.

In accordance with the proposed method, position information for searching CCH is transmitted. When a plurality of UEs are multiplexed in one TTI, the number of detection attempts to find its own control information can be reduced. Using the position information bitmap, detection of control information is performed only at the position where its own MCS level and MIMO mode are used. Accordingly, the number of detection attempts can be reduced greatly when compared with a case where detection is performed without position information. Without the position information, a UE can detect control information only when accurate indication of a MIMO mode from an upper layer. When a UE does not know which MIMO mode is used, the UE has to decode every control information for all available MIMO modes.

Table 8 shows the number of detection attempts in the proposed method.

TABLE 8

| UE | Number of detection attempts |
|---|---|
| 1 | 1 |
| 2 | 1 |
| 3 | 2 |
| 4 | 1 |
| 5 | 1 |
| 6 | 1 |

As shown in Table 8, the number of detection attempts decreases by using the position information. It is also unnecessary to transmit information on the MIMO mode through an upper layer signaling. This reduction can decrease complexity due to decoding of the control information and save power consumption caused by decoding.

Figure 13:
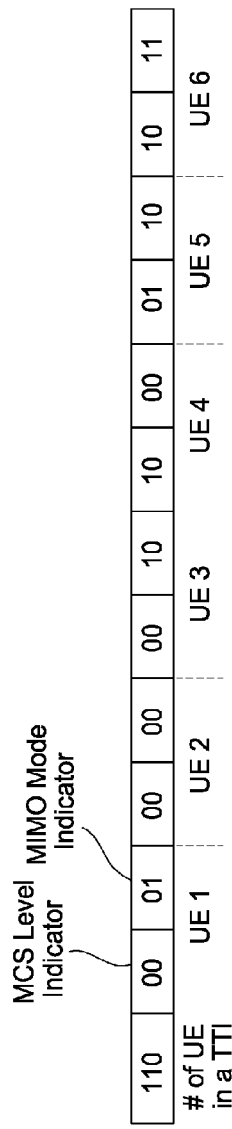
FIG. 13 shows another example of a position information bitmap.

FIG. 13 shows another example of a position information bitmap.

Referring to FIG. 13, a position information bitmap includes a count field which represents a number of UEs that are multiplexed in a TTI. Position information of respective UEs is attached after the count field. The count field has the number of bits of [$\log_2$(the maximum number of UEs included in a TTI)].

Table 9 shows a configuration example of the position information bitmap.

TABLE 9

| | Field | Description |
|---|---|---|
| Category 0 | Number of UE | Indicate how many UEs exist in a corresponding TTI and have the number of bits: [$\log_2$(a maximum number of UEs included in one TTI)] |
| | Position information | Indicate position information of control channel of each UE and have the number of |

TABLE 9-continued

| Field | Description |
|---|---|
| of control channel | bits: the number of UEs × {[$\log_2$ (a total number of MCS levels) + [$\log_2$ (a total number of MIMO modes)]} |

This figure shows a example of the position information bitmap where a maximum number of UEs that may be multiplexed in one TTI is 8. Since the maximum number of multiplexed UEs is 8, the count field has 3 bits. The size of the position information bitmap may be variable depending on the maximum number of multiplexed UEs.

A UE can know how many UEs are multiplexed in a TTI based on the count field, and tries to detect control information using next position information.

Figure 14:
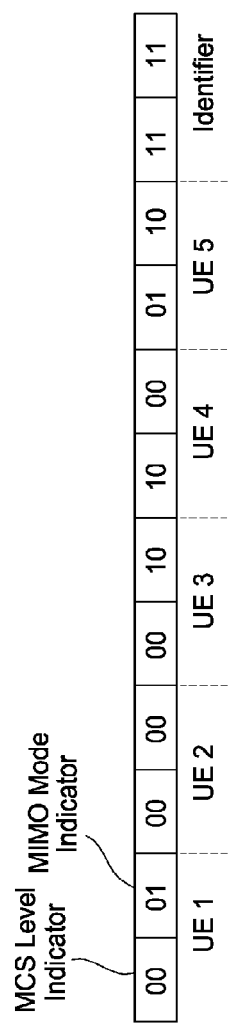
FIG. 14 shows still another example of a position information bitmap.

FIG. 14 shows still another example of a position information bitmap.

Referring to FIG. 14, a position information bitmap is represented as many as a number of UEs that are multiplexed in one TTI. When the maximum number of multiplexed UEs is predetermined, position information for all UEs can be represented by the bitmap. Here, the number of bits required in the position information bitmap is the maximum number of UEs×[log (a total number of MCS levels)]+[log (a total number of MIMO modes)].

If the maximum number of multiplexed UEs is different from the actual number of multiplexed UEs, an identifier is added to the tail of the position information bitmap. For example, a portion indicated by '11' corresponds to an identifier. For example, when only control information about 5 UEs is multiplexed in one subframe although the maximum number of multiplexed UEs is 8, the identifier may be added following the position information of the UE 5. The identifier may be of any kind, and the number of bits or contents thereof is not limited.

A UE can acquire information on the number of multiplexed UEs based on the position information bitmap having fixed length although the UE does not know the number of multiplexed UEs. For example, if position information of one UE includes a MCS level indicator and a MIMO mode indicator, the UE can know the actual number of multiplexed UEs by counting the position information in the TTI. When the maximum number of multiplexed UEs is identical to the number of multiplexed UEs, it is not necessary to add the identifier.

FIG. 15 shows an example of a position information bitmap.

Referring to FIG. 15, a position information bitmap includes the number of UEs in each MCS level. For example, three MCS levels shown in Table 2 are taken into consideration. In order to represent the number of UEs in a MCS levels, bits as many as [$\log_2$(the maximum number of multiplexed UEs)] every MCS level are required. For example, assuming that a maximum number of multiplexed UEs in a TTI is 8, 3 bits are necessary in each MCS level so as to represent the number of UEs in each MCS level. In order to represent the all number of UEs using respective MCS levels, bits as many as the total number of the MCS levels×[$\log_2$(the maximum number of multiplexed UEs)] are required.

This figure shows a case where, of the eight UEs, a MCS level 1 is used by UE 1, UE 3, UE 6, and UE 8, a MCS level 2 is used by UE 2 and UE 5, and a MCS level 3 is used by UE 4 and UE 7. The MIMO mode indicator uses the example shown in Table 6. Accordingly, the number of UEs in the MCS level 1 is four and therefore bit representation becomes '100', the number of UEs in the MCS level 2 is two and therefore bit representation becomes '010', and the number of UEs in the MCS level 3 is two and therefore bit representation becomes '010'.

Fields indicating the number of UEs in each MCS levels, are 9 bits of the former part of the position information bitmap, and the latter bits indicate the MIMO modes of each UEs. The total number of bits of the position information bitmap is {a total number of MCS levels×[log (a maximum number of UEs belonging to the system bandwidth)]}+{the number of UEs×[$\log_2$(a total number of MIMO modes)]}. At this time, the MIMO modes are grouped according to MCS levels. Here, the MIMO modes are arranged in order of the MCS level 1, the MCS level 2 and the MCS level 3. The MIMO mode indicators of UE 1, UE 3, UE 6 and UE 8 in the MCS level 1 are arranged, the MIMO mode indicators of UE 2 and UE 5 in the MCS level 2 are arranged, and the MIMO mode indicators of UE 4 and UE 5 in the MCS level 3 are arranged. The arrangement order of the MIMO modes is not limited and can be modified in various ways.

Table 10 shows a configuration example of position information.

TABLE 10

| Category | Field | Description |
| --- | --- | --- |
| Category 0 | Position information of control channel | Number of UE in a MCS level: Indicate the number of UEs in the MCS level and have the number of bits: a total number of MCS levels × [$\log_2$ (a maximum number of UEs belonging to the system bandwidth)] |
| | MIMO mode indicator | Indicate MIMO mode used by each UE and have the number of bits: the number of UEs × [$\log_2$ (a total number of MIMO modes)] |

The position information bitmap can be transmitted on a broadcast channel or a L1/L2 control channel.

Figure 16:
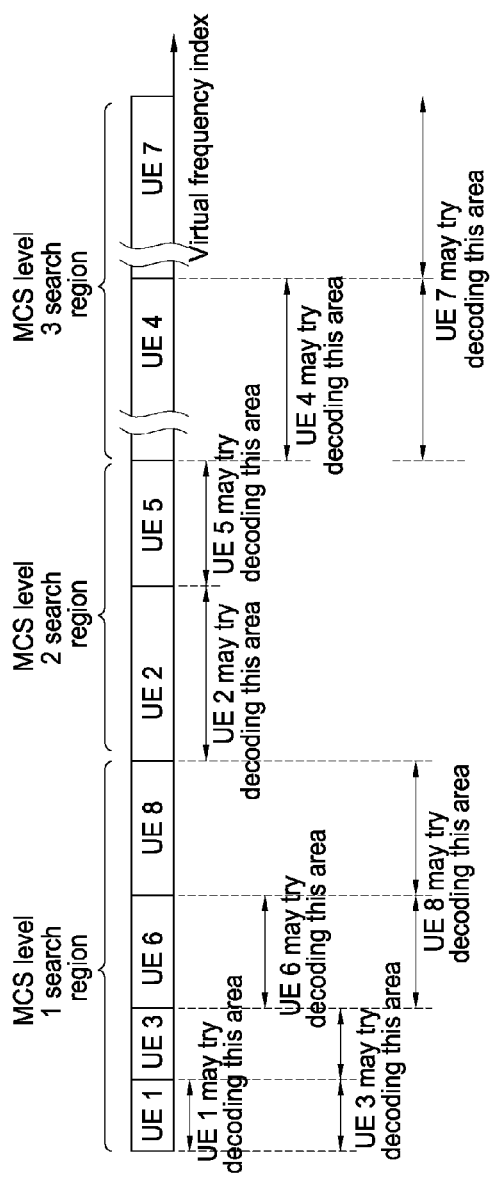
FIG. 16 illustrates control information detection employing the position information bitmap of FIG. 15.

FIG. 16 illustrates control information detection employing the position information bitmap of FIG. 15. A UE knows it own MCS level and a MIMO mode. Further, the UE knows how many UEs are multiplexed in a TTI and the number of antennas. The UE decodes position information as many as bits {the total number of MCS levels×[$\log_2$(the maximum number of multiplexed UEs)]+{the number of UEs×[log (the total number of MIMO modes)].

Referring to FIG. 16, assuming that a maximum number of multiplexed UEs in a TTI is 8, UE 1, UE 3, UE 6 and UE 8 use the MCS level 1, UE 2 and UE 5 use the MCS level 2, and UE 4 and UE 7 use the MCS level 3. A UE checks the number of multiplexed UEs in each MCS levels and MIMO modes from the position information bitmap and tries detection of CCHs only at the corresponding position. When the number of multiplexed UEs in each MCS levels and the MIMO modes are known, the UE can know the amount of resources occupied by the control information of each UE and try detection of CCHs only at the corresponding positions.

The UE 1 checks the number of UEs using the same MCS levels as its own MCS level and performs detection of the control information only at a corresponding position with respect to a MIMO mode that could be supported by itself. In other words, the UE 1 checks how many UEs use the MCS level 1, confirms that the number of the UEs using the MCS level 1 is four, and then checks the first four MIMO mode indicators among the entire MIMO mode indicators. Since the number of its antenna is one, UE 1 tries detection of control information only at the position indicated by the MIMO indicator 'SISO'.

The UE 3 using one antenna tries detection of control information with respect to the position having the MCS level 1 and the MIMO indicator 'SISO'. As a result, the UE 3 can detect its own control information through two detection attempts. The UE 6 uses the MCS level 1, but multiple antennas and, therefore, need not to try detection with respect to the position where the MIMO mode indicator indicates 'SISO'. Accordingly, the UE 6 can find its own control information through one detection attempts.

When its own control information is detected, the UE receives data using the control information. When its own control information is not detected, the UE tries detection of control information at the next position.

In accordance with the proposed method, position information for searching CCH (or control information) on the multiplexed control channel is employed. In a situation where UEs using several MIMO modes and MCS levels are multiplexed in one TTI, the number of detection attempts in order fro the UE to find its own control information can be reduced. When using the position information bitmap, detection of control information is performed only at the position where the same MCS as that of its own MCS level is used and a MIMO mode that can be supported is used. Accordingly, the number of detection attempts can be reduced greatly when compared with a case where detection is performed without position information.

Table 11 shows the number of detection attempts in the proposed method.

TABLE 11

| UE | Number of detection attempts |
| --- | --- |
| 1 | 1 |
| 2 | 1 |
| 3 | 2 |
| 4 | 1 |
| 5 | 1 |
| 6 | 1 |
| 7 | 2 |
| 8 | 2 |

As shown in Table 11, the number of detection attempts can be reduced. It is also unnecessary to transmit information on MIMO modes through upper layer signaling. This reduction can decrease complexity due to decoding of the control information and save power consumption caused by decoding.

Figure 17:
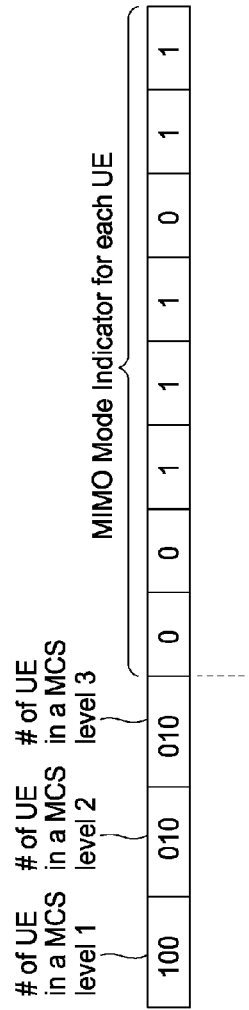
FIG. 17 shows another example of a position information bitmap.

FIG. 17 shows another example of a position information bitmap.

Referring to FIG. 17, the number of multiplexed UEs in one TTI is 8 and a MIMO mode indicator is represented by 1 bit. The method of representing the number of multiplexed UEs in each MCS level in the position information bitmap is same as that of the embodiment of FIG. 15, but the MIMO mode is represented by 1 bit.

If the amount of control information is unchanged irrespective of the MIMO modes such as SU-MIMO (SCW), SU-MIMO (MCW) and MU-MIMO, it is possible to detect control information in a given classification about whether a UE uses SISO or MIMO. Therefore, the MIMO mode indicator can be represented by only 1 bit. For example, '0' indicates that one antenna is used and '1' indicates that multiple antennas are used.

Table 12 shows a configuration example of position information.

TABLE 12

| | Field | | Description |
|---|---|---|---|
| Category 0 | Position information of control channel | Number of UE in each MCS level | Indicate the number of UEs using a corresponding MCS level and have the number of bits: the total number of MCS levels × [$\log_2$ (the maximum number of multiplexed UEs)] |
| | | MIMO mode indicator | Indicate MIMO mode used by each UE and have the number of bits corresponding to the number of UEs |

Figure 18:
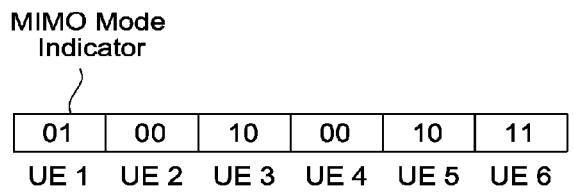
FIG. 18 shows an example of a position information bitmap.

FIG. 18 shows an example of a position information bitmap.

Referring to FIG. 18, the number of multiplexed in one TTI is 6 and the MIMO mode indicator is represented by 2 bits. If a MCS level is defined to be one or each UE knows its own MCS level, only the MIMO mode indicator can be transmitted as the position information bitmap.

Figure 19:
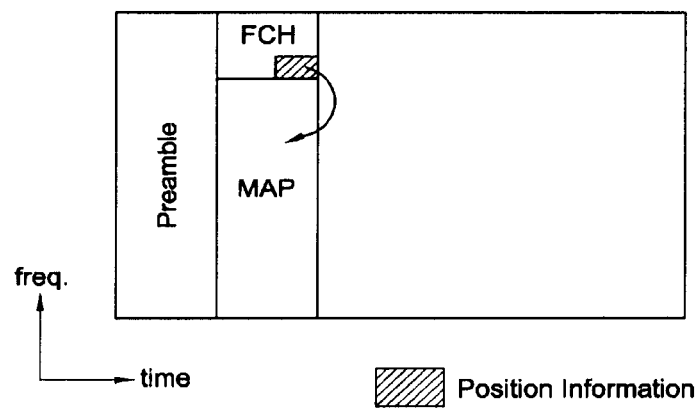
FIG. 19 shows an example of a frame structure employing position information.

FIG. 19 shows an example of a frame structure employing position information.

Referring to FIG. 19, a frame includes a preamble, a frame control header (FCH) and MAP. Further, the frame can include a downlink burst carrying downlink data which are sent from a BS to a UE and/or an uplink burst carrying uplink data which are sent from a BS to a UE. The preamble is placed at the beginning of the frame and used for initial synchronization between a BS and a UE, cell search, frequency offset and channel estimation.

The FCH carries a downlink frame prefix which includes information for decoding MAP and position information. The MAP includes indication and/or control information of the downlink burst and/or uplink burst. The downlink frame prefix includes position information of control information of each UE in the MAP. A UE can detect its own control information in the MAP according to the position information of the FCH.

Figure 20:
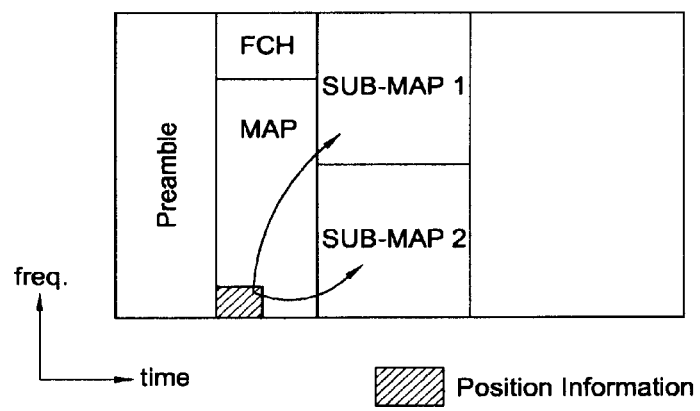
FIG. 20 shows another example of a frame structure employing position information.

FIG. 20 shows another example of a frame structure employing position information.

Referring to FIG. 20, a frame includes a preamble, a FCH, MAP, and at least one submap. The preamble is placed at the beginning of the frame and used for initial synchronization between a BS and a UE, cell search, frequency offset and channel estimation. The FCH carries a downlink frame prefix which includes information for decoding MAP.

The MAP includes position information which indicates the position of control information for each UE in a submap. The submap includes indication of a downlink burst and/or uplink burst. A UE can detect its own control information in the submap according to the position information of MAP.

Every function as described above can be performed by a processor such as a micro-processor based on software coded to perform such function, a program code, etc., a controller, a micro-controller, an ASIC (Application Specific Integrated Circuit), or the like. Planning, developing and implementing such codes may be obvious for the skilled person in the art based on the description of the present invention.

Although the embodiments of the present invention have been disclosed for illustrative purposes, those skilled in the art will appreciate that various modifications, additions and substitutions are possible, without departing from the scope of the invention. Accordingly, the embodiments of the present invention are not limited to the above-described embodiments but are defined by the claims which follow, along with their full scope of equivalents.

The invention claimed is:

1. A method for monitoring a downlink control channel in a wireless communication system, the method performed by a user equipment (UE) and comprising:
   receiving a plurality of downlink control channels in a subframe, wherein the plurality of downlink control channels include a UE-specific search space, wherein the plurality of downlink control channels are defined based on a plurality of levels including a first level, a second level, and a third level, wherein a value of the third level is two times greater than a value of the second level, and wherein a value of the second level is two times greater than a value of the first level; and
   monitoring at least one of the plurality of downlink control channels, wherein a monitored space of the at least one of the plurality of downlink control channels is determined by using UE-specific information which is used to identify the UE and at least one of the plurality of levels.

2. The method of claim 1, wherein the plurality of downlink control channels are physical downlink control channels (PDCCHs).

3. The method of claim 1, wherein the subframe includes a plurality of orthogonal frequency division multiplexing (OFDM) symbols.

4. A user equipment for monitoring a downlink control channel in a wireless communication system,
   a radio frequency (RF) unit that transmits and receives signals; and
   a processor, coupled to the RF unit, that:
      controls the RF unit to receive a plurality of downlink control channels in a subframe, wherein the plurality of downlink control channels include a UE-specific search space, wherein the plurality of downlink control channels are defined based on a plurality of levels including a first level, a second level, and a third level, wherein a value of the third level is two times greater than a value of the second level, and wherein a value of the second level is two times greater than a value of the first level; and
      monitors at least one of the plurality of downlink control channels, wherein a monitored space of the at least one of the plurality of downlink control channels is determined by using UE-specific information which is used to identify the UE and at least one of the plurality of levels.

5. The user equipment of claim 4, wherein the plurality of downlink control channels are physical downlink control channels (PDCCHs).

6. The user equipment of claim 4, wherein the subframe includes a plurality of orthogonal frequency division multiplexing (OFDM) symbols.

* * * * *